United States Patent [19]

Hinsley et al.

[11] Patent Number: 5,283,830
[45] Date of Patent: Feb. 1, 1994

[54] SECURITY MECHANISM FOR A COMPUTER SYSTEM

[75] Inventors: Stewart R. Hinsley, Alsager; Christopher D. Hughes, Audlem, both of Great Britain

[73] Assignee: International Computers Limited, London, Great Britain

[21] Appl. No.: 954,570

[22] Filed: Sep. 30, 1992

[30] Foreign Application Priority Data

Dec. 17, 1991 [GB] United Kingdom ............... 9126779

[51] Int. Cl.$^5$ .................. H04K 1/00; H04L 9/00; H04L 9/02
[52] U.S. Cl. ............................. 380/25; 380/49; 364/DIG. 1
[58] Field of Search ............... 380/25, 49; 364/DIG. 1

[56] References Cited

U.S. PATENT DOCUMENTS

| | | | |
|---|---|---|---|
| 4,455,602 | 6/1984 | Baxter et al. | 364/200 |
| 4,498,132 | 2/1985 | Ahlstrom et al. | 364/200 |
| 5,136,712 | 8/1992 | Perazzoli et al. | 364/DIG. 1 |

FOREIGN PATENT DOCUMENTS 0398645 11/1990 European Pat. Off. .

OTHER PUBLICATIONS

Kelter, "Discretionary Access Controls in a High-Performance Object Management System", IEEE Symposium on Security and Privacy, May 1991, pp. 288-299.
Graham, et al, "Protection-Principles and Practice", Proceedings of Spring Joint Computer Conference, vol. 40, 1972, pp. 417-429.

Primary Examiner—Stephen C. Buczinski
Attorney, Agent, or Firm—Lee, Mann, Smith, McWilliams, Sweeney & Ohlson

[57] ABSTRACT

A computer system includes a plurality of programs and a plurality of accessible objects. Each program has an associated program identifier, and at least some of the objects have respective access control lists (ACL). Each ACL entry may comprise a program identifier key and an access permission indication. When a user attempts to access an object by way of a program, an entry in the ACL of the object is selected by matching the entry keys with at least the program identifier of the program, and access is granted or denied on the basis of the access permission indication in the selected entry.

8 Claims, 1 Drawing Sheet

SECURITY MECHANISM FOR A COMPUTER SYSTEM

BACKGROUND TO THE INVENTION

This invention relates to security mechanisms for computer systems. More specifically, the invention is concerned with a means for controlling access to files and other objects so as to protect the data from access by unauthorised programs and to allow the confidentiality and integrity of data residing in the system to be maintained.

Many computer systems, including enhanced security versions of UNIX, (UNIX is trade mark of Unix System Laboratories Inc) permit access to files, etc to be controlled by associating with each file a list of the users (and/or groups of users) who are allowed to access the file, with the types of access permitted to each. This list is an example of an Access Control List (ACL). For example, a file might have associated with it the ACL:

| jo:    | rwx |
|--------|-----|
| alex:  | —   |
| chris: | –x  |
| *:     | r-x | indicating that jo is permitted to read, write or execute the file; alex is not permitted to access it at all; chris is permitted only to execute it; and everyone else (the * entry) is permitted to read and execute it.

Each file also has an owner, who is the only user that is allowed to change the ACL.

Several years ago a seminal paper was published on access control in commercial systems (A Comparison of Commercial and Military Security Policies, Clark & Wilson, IEEE Oakland Conference on Security and Privacy, 1987). A premise of the paper is that access control in commercial systems needs to be based not only on the identity of the user requesting the action, but also on the identity of the program which is acting on the user's behalf to access the data.

An object of the present invention is to provide an improved security mechanism for a computer system. This mechanism builds on the above proposal to provide support for application implemented security policies via access control based on the identity of the program.

SUMMARY OF THE INVENTION

According to the invention, there is provided a computer system including a plurality of programs and a plurality of accessible objects, each program having an associated program identifier, and at least some of the objects having respective access control lists (ACL) associated with them, each ACL containing a list of entries, wherein each entry comprises a key and an access permission indication, and at least some of the keys comprise program identifiers, and wherein the system includes means operative when a user attempts to access an object by way of a program, for selecting an entry in the ACL of the object by matching the entry keys with at least the program identifier of the program, and for granting or denying access on the basis of the access permission indication in the selected entry.

For example, the program identifier may be a certification identification number.

DESCRIPTION OF AN EMBODIMENT OF THE INVENTION

One embodiment of the invention will now be described by way of example with reference to the accompanying drawings.

Figure 1:
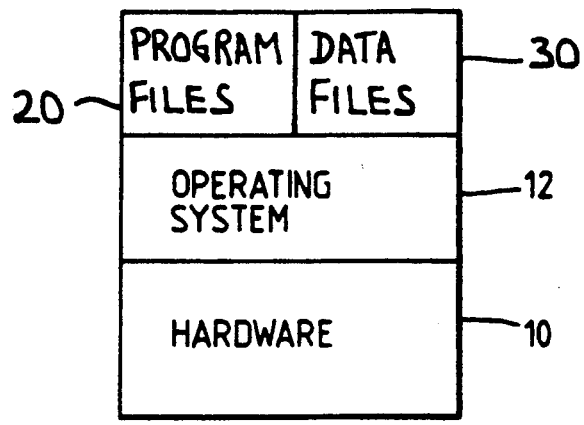
FIG. 1 is a schematic block diagram showing a computer system in accordance with the invention.

Referring to FIG. 1, this illustrates a computer system, comprising computer hardware 10, an operating system 12 and a collection of application program files 20. For example, the hardware 10 and operating system 12 may comprise an ICL DRS 500 computer running under the UNIX operating system. The application program files 20 may include a database program, which maintains a number of database files 30.

Figure 2:
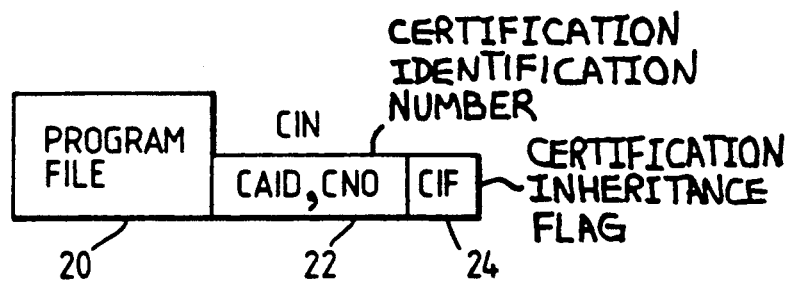
FIG. 2 is a diagram illustrating the association of a certification identification number (CIN) with a program file.

Referring now to FIG. 2, each file 20 containing an application program has a certification identification number (CIN) 22 attached to it. A CIN can be specified for any program, to certify that the program provides adequate control over its data. If the CIN is null this indicates that the program is currently uncertified.

A user may, if desired, allocate the same CIN to a number of different programs, for example, where all the programs share access to the same data.

Each CIN has two parts: a certification identification authority identity (CAID) and a certification number (CNO). The CNO contains a value specified by the user. The CAID, on the other hand, is supplied by the operating system and contains the user identifier of the user who specified the CIN (normally the program owner).

Because part of the CIN is supplied by the operating system and is not under the control of the user, it is impossible for another user deliberately or accidentally to assign the same CIN to another program.

Special functions are provided in the operating system to permit a user to specify or change the CIN of a program.

If a program file is updated the program cannot necessarily still be trusted to implement the same security policy on its data; in effect, the certification of it is no longer valid. For this reason, whenever a write occurs to a program file with a CIN, the CIN is automatically cleared to a null value. The certifier must then respecify an appropriate CIN for the program.

Each program file also has a certification inheritance flag (CIF) 24 associated with it. This is used, as will be described, to control the inheritance of the CIN. The CIF is undefined if the CIN is null.

In UNIX, a process is defined as an instance of a program in execution. Each process has a set of attributes associated with it, including the identity of the user. A new process is created as the result of a fork system call. A process has a new program loaded into it as the result of an exec system call.

In the present embodiment of the invention each process has a CIN and a CIF associated with it as part of its attributes, in a similar manner to a program.

Wherever a new process is created as the result of a fork, the CIN and CIF of the parent process are inherited by each child process, along with other process attributes.

Whenever a process has a new program loaded as the result of an exec a check is made to ascertain whether certification inheritance is enabled (i.e. whether or not the CIF of the current process is set). If inheritance is enabled then the CIN and CIF are unchanged by the exec. If, on the other hand, inheritance is not enabled, then the CIN and CIF of the process take their values from the program that is to be executed. If the process is not certified (i.e. its CIN is null), then there is no inheritance and any certification is derived from the program to be executed.

Figure 3:
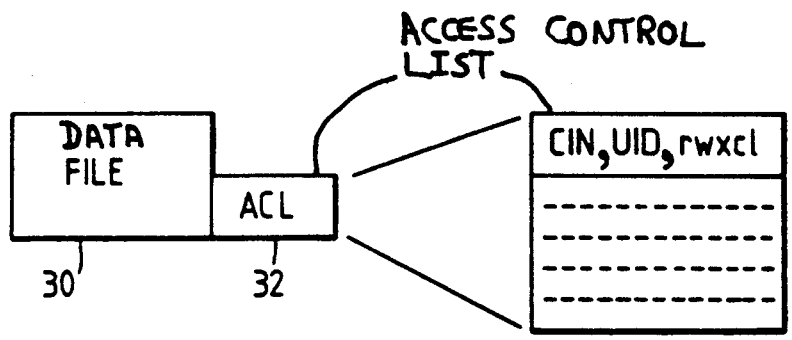
FIG. 3 is a diagram illustrating the association of an access control list (ACL) with a file.

Referring to FIG. 3, whenever a file 30 is created in the system, an access control list (ACL) 32 is attached to the file by the operating system function (e.g. creat) that creates the file.

The ACL comprises a list of entries, each containing a key and a set of access permissions. The key consists of a CIN, a user identity UID and a group identity GID (not shown). The access permissions comprise: r (read), w (write), x (execute), l (link control) and c (change attributes). Other access permissions may also be provided for application use.

When set, the read access permission bit r allows read access to the file. Similarly, the write access permission bit w controls write accesses to the file.

The execute permission bit x allows the contents of the file to be executed as a program.

The change attributes permission bit c can be used to ensure that an unauthorised user cannot get access to a file by changing the ACL. For example, a program creating a file may wish to ensure that datafiles it creates are only ever accessible via the program, and that even the user running the program and thus creating the files, cannot get access by other means. This is achieved by clearing the change attributes permission bit c in each ACL entry.

The link control permission bit l gives permission to change the name of a file, to give it additional names, or to delete it. This permission is required to use the link, unlink and rename system calls. This can be used, for example, by a program to ensure that the data files it accesses are always the same as the files it created, and that it cannot be tricked into accessing other data by unauthorised changes to the names of the files.

Each field in the key of an ACL entry can be given a wild card value to indicate that any value is acceptable. For example, considering only the CIN and UID fields of the key, a file might be given the ACL:

| *:jo:          | rw— |
|----------------|-----|
| viewcin:chris: | r—  |
| *:*:           | —   |

Here jo is given read and write access whatever program (s)he is using; chris is given read access but only when using a program with CIN=viewcin; all other program/user combinations are denied access to the file.

It should be noted that there are no restrictions on the values put into the key fields (CIN and UID) of an ACL entry. In particular, a user can specify any CAID in a CIN. Thus, a user creating a file can specify that access to the file is permitted with a certain CIN, without having to be the user who certified the program.

If a user creating a file does not specify any ACL for that file, the operating system automatically assigns a default ACL for that file.

Figure 4:
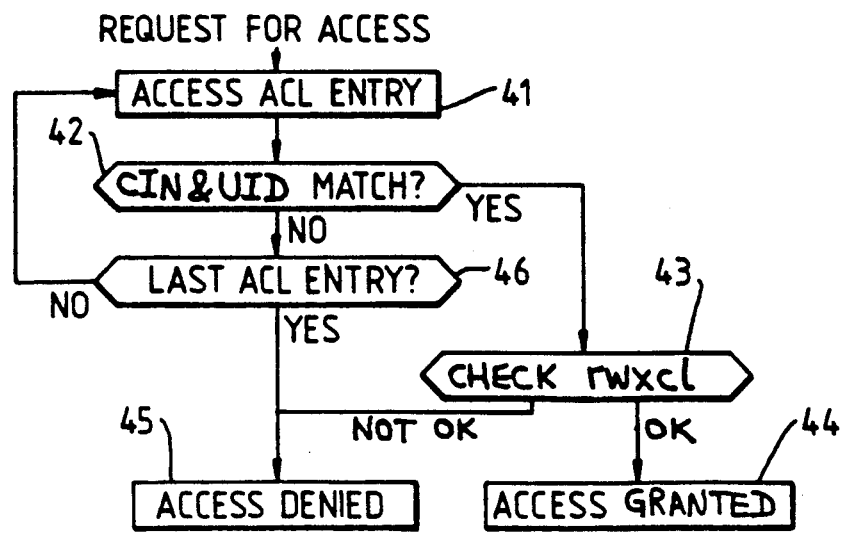
FIG. 4 is a flowchart showing a procedure for checking access permissions.

Referring to FIG. 4, this shows a routine which is provided for checking whether an access request from a particular process to a particular file is permitted.

This routine is called from any operating system functions (such as access and open) that access files.

The routine sequentially accesses (41) each entry in the ACL of the file in turn. For each entry, the routine checks (42) for an attribute match, by comparing the CIN, UID and GID in that entry with the CIN, UID and GID associated with the process that is attempting to access the file. If an attribute match is found, the access permission bits in the entry are checked (43) to see whether the requested access is permitted. If so, the requested access to the file is granted (44); otherwise access is denied (45). If an attribute match was not found, a check (46) is made to see if this is the last entry in the ACL, and, if so, access is denied (45). Otherwise, the routine returns to step 41 above to access the next ACL entry.

Thus, it can be seen that the routine operates on a first match basis—access is granted according to the first key matched.

In summary, it can be seen that use of CINs as program identifiers and in ACL entries provides an access control mechanism that allows access to data to be mediated on the basis of a program/user/file triple, rather than the traditional user/file pair. An appropriate authority (e.g., the owner of a program, or the system security manager) can apply a CIN to a program; it cannot be forged by any other user, and will be cleared if the program is changed. Users can then grant access exclusively through the certified program in a manner which cannot be circumvented by manipulating the name or attributes of the object. Thus the program can apply a security policy to the data that cannot be circumvented; and owners of data can grant access to others on the basis of the service provided by a particular program.

We claim:

1. A computer system including a plurality of programs and a plurality of objects, accessible by a plurality of users, each program having an associated program identifier, each user having a user identifier, and at least some of the objects having respective access control lists (ACL) associated with them, each ACL containing a list of entries, each entry comprising a program identifier key, a user identifier key and an access permission indication, and wherein the system includes means operative when a user attempts to access an object by way of a program, for selecting an entry in the ACL of the object by matching the program identifier key and user identifier key in the entry with the program identifier of the program and the user identifier of the user and for granting or denying access on the basis of the access permission indication in the selected entry.

2. A system according to claim 1 wherein the program identifier is a certification indication number (CIN) associated with the program by user certification action.

3. A system according to claim 2 including means for removing certification from a program when the program is modified.

4. A system according to claim 1 wherein the access permission indication includes means for controlling permission to change the attributes of the object.

5. A system according to claim 1 wherein the access permission indication includes means for controlling permission to change the name of the object.

6. A system according to claim 1 wherein the access permission indication includes means for controlling permission to delete the object.

7. A system according to claim 2 wherein each CIN comprises first and second parts, and wherein the system includes means for allocating said first part without user intervention and means for permitting a user to specify said second part.

8. A system according to claim 2 wherein each CIN has an inheritance flag associated with it, and wherein the system includes means operative when a new process is created to execute a program, for using the inheritance flag associated with the CIN of that program to control whether the new process derives its CIN from its parent process or from the program.

* * * * *